United States Patent [19]

Hazelton et al.

[11] Patent Number: 4,894,408

[45] Date of Patent: Jan. 16, 1990

[54] THERMOPLASTIC OLEFIN COMPOSITIONS OF EPDM RUBBER AND ETHYLENE COPOLYMER RESIN

[75] Inventors: Donald R. Hazelton, Chatham; Robert C. Puydak, Cranbury, both of N.J.

[73] Assignee: Exxon Chemical Patents Inc., Linden, N.J.

[21] Appl. No.: 235,858

[22] Filed: Aug. 23, 1988

[51] Int. Cl.$^4$ .................. C08L 23/28; C08L 23/32; C08L 23/08; C08L 33/00
[52] U.S. Cl. .................. 524/425; 524/445; 524/522; 524/523; 524/524; 525/93; 525/192; 525/194; 525/195; 525/196; 525/197; 525/221; 525/211; 525/222; 525/227; 525/133
[58] Field of Search ............ 525/194, 222, 227, 211, 525/93, 221; 524/425

[56] References Cited

U.S. PATENT DOCUMENTS

| | | | |
|---|---|---|---|
| 3,592,881 | 7/1971 | Ostapchenko | 525/222 |
| 4,212,787 | 7/1980 | Matsuda et al. | 525/211 |
| 4,350,795 | 9/1982 | Bohm et al. | 525/194 |
| 4,607,074 | 8/1986 | Hazelton et al. | 525/194 |
| 4,639,487 | 1/1987 | Hazelton et al. | 524/425 |

*Primary Examiner*—Carman J. Seccuro
*Attorney, Agent, or Firm*—H. L. Cohen; W. G. Muller

[57] ABSTRACT

Heat shrinkable thermoplastic compositions are prepared by blending an ethylene copolymer resin with an EPDM rubber and dynamically vulcanizing the rubber. The ethylene copolymer resin is a copolymer of ethylene with an alkyl ester of an alpha, beta monoethylenically unsaturated monocarboxylic acid as well as copolymers of ethylene with the acid per se. The preferred copolymer is ethylene-vinylacetate copolymer. Uncured rubber can be included in the composition.

23 Claims, No Drawings

THERMOPLASTIC OLEFIN COMPOSITIONS OF EPDM RUBBER AND ETHYLENE COPOLYMER RESIN

BACKGROUND OF THE INVENTION

1. Field of the Invention

The present invention relates to polymer blends which have a combination of both elastic and thermoplastic properties and, more particularly, relates to dynamically vulcanized alloys (DVAs) wherein an EPDM rubber is dispersed into a thermoplastic ethylene copolymer resin and subsequently vulcanized by dynamic vulcanization techniques utilizing a non-peroxide curing system. Compositions of the present invention when fully cured manifest unexpected resiliency characteristics as well as improved heat shrinkability.

2. Prior Art

Dynamic vulcanization techniques for producing polymer compositions having both elastic and thermoplastic properties are described by Gessler and Haslett in U.S. Pat. No. 3,037,954 wherein a vulcanizable elastomer is dispersed into a resinous thermoplastic polymer and subsequently cured while continuously mixing and shearing the polymer blend. The result is a microgel dispersion of cured rubber in an uncured matrix of resinous thermoplastic polymer.

Dynamically cured thermoplastic olefin ("TPO") compositions wherein the elastomeric material is an EPDM rubber are well known. For example, U.S. Pat. No. 4,130,535 discloses fully cured TPO compositions wherein the rubber component is an ethylene-propylene terpolymer (EPDM) and the thermoplastic polyolefin resin is polypropylene. Ethylene copolymer resins are not disclosed. The curative system may include a peroxide, azide or accelerated sulfur curative system.

U.S. Pat. No. 4,311,628 discloses fully cured TPO compositions wherein the rubber component is an EPDM rubber and the demonstrated thermoplastic polyolefin resin is polypropylene. Improved compression set is reportedly achieved utilizing a phenolic curative which includes a phenolic curing resin and a cure activator such as zinc oxide. Ethylene copolymer thermoplastic resins are not disclosed.

Other patents which disclose a least partially cured EPDM-containing compositions include U.S. Pat. Nos. 4,409,365; 4,350,795; 4,212,787; 4,202,801; 4,087,485; 3,904,470; 3,862,106; 3,806,558; and 3,758,643; and JP 8145741.

TPO compositions wherein the thermoplastic polymer resin is an ethylene copolymer resin utilized in the present invention are also well known. For example, U.S. Pat. No. 4,639,487 discloses fully cured TPO compositions wherein the thermoplastic polyolefin resin is an ethylene-vinyl ester copolymer or an ethylene-alkyl acrylate copolymer and a rubber component selected from a group of rubber materials which includes butyl, halogenated butyl, EPDM, polyisoprene, polychloroprene, SBR, nitrile and chlorosulfonated polyethylene rubbers. The curative system can be any non-peroxide curing system.

Other patents which disclose at least partially cured TPOs containing the ethylene copolymer resins utilized in the present invention include U.S. Pat. Nos. 4,350,795 and 4,212,787; and JP 8145741.

SUMMARY OF THE INVENTION

The present invention resides in the discovery that unexpected superior resiliency characteristics as well as improved heat shrink properties are obtained from DVAs wherein an EPDM rubber is dispersed into an ethylene-alkyl acrylate copolymer resin or an ethylene-vinyl ester copolymer resin and subsequently vulcanized by dynamic vulcanization techniques utilizing a non-peroxide curing system. DVAs comprising this particular EPDM rubber in combination with one of these particular ethylene copolymer resins are particularly suited for utilization in window-seal and weatherstrip applications which require retention of sealing capability under dynamic conditions.

DETAILED DESCRIPTION

This invention relates to DVA compositions having unexpected resiliency properties and improved heat shrink properties. In particular it relates to thermoplastic elastomeric compositions which, while having the reprocessibility of thermoplastic resins, are heat shrinkable and elastomeric in nature and, most importantly, manifest unexpected resiliency characteristics. The DVA compositions of this invention are obtained by blending a particular thermoplastic ethylene copolymer resin with a particular rubber, namely, an EPDM rubber, and fully curing the rubber by dynamic vulcanization techniques.

As used in the specification and claims, the term "dynamic vulcanization" means a vulcanization process for a rubber-containing TPO composition wherein the rubber is vulcanized under conditions of high shear. As a result, the rubber is simultaneously cross-linked and dispersed as fine particles of a "micro-gel" within a polyolefin matrix. Dynamic vulcanization is effected by mixing the TPO ingredients at a temperature which is at or above the curing temperature of the rubber in equipment such as roll mills, Banbury mixers, continuous mixers, kneaders or mixing extruders, e.g., twin screw extruders. The unique characteristic of the dynamically cured compositions is that, notwithstanding the fact that the rubber component is fully cured, the compositions can be processed and reprocessed by conventional rubber processing techniques such as extrusion, injection molding, compression molding, etc. Scrap or flashing can be salvaged and reprocessed.

The term "dynamically vulcanized alloy" (DVA) as used in the specification and claims means a composition comprising a thermoplastic copolymer resin and a rubber wherein at least a part of the rubber has been dynamically vulcanized to a fully cured state. The compositions are prepared by blending together the polyolefin resin and the rubber with a curative system under conditions of dynamic vulcanization.

In preparing the DVA compositions of this invention, at least one ethylene copolymer resin is blended with at least one EPDM rubber and the EPDM rubber is vulcanized by dynamic vulcanization utilizing a non-peroxide cure system. While blends of polyolefin resins may be utilized in the practice of this invention, the preferred polyolefin resin is a copolymer of ethylene with unsaturated esters of lower carboxylic acids and the DVA composition of this invention must include a polyolefin resin of the preferred class. Polyolefin resins which can optionally be incorporated in the compositions of the invention include polybutylene, LDPE, VLDPE and LLDPE.

The term "low density polyethylene" or "LDPE" as used in the specification and claims means both low and medium density polyethylene having densities of about 0.910 to about 0.940 g/cc. The terms include linear polyethylene as well as copolymers of ethylene which are thermoplastic resins.

The term "very low density polyethylene" or "VLDPE" as used in the specification and claims means polyethylene having a density of below about 0.910 g/cc and include linear polyethylene as well as copolymers of ethylene which are thermoplastic resins.

Linear low density polyethylene (LLDPE) as used in the specification and claims means low and very low density polyethylene characterized by little, if any, long chain branching. The processes for producing LLDPE are well known in the art and commercial grades of this polyolefin resin are available. Generally, it is produced in gas-phase fluidized bed reactors or liquid-phase solution process reactors, the former process can be carried out at pressures of about 100 to 300 psi and temperatures as low as 100° C.

The term "polybutylene" as used in the specification and claims means thermoplastic resins of both poly (1-butene) homopolymer and the copolymer with, for example, ethylene, propylene, pentene-1, etc. Polybutylene is manufactured via stereospecific Ziegler-Natta polymerization of monomer(s). Commercially useful products are of high molecular weight and isotacticity. A variety of commercial grades of both homopolymer and ethylene-butene-1 copolymer are available with melt indices that range from about 0.3 to about 20g/10 min.

The term "ethylene copolymer resin" as used in the specification and claims means copolymers of ethylene with an alkyl ester of an alpha, beta monoethylenically unsaturated monocarboxylic acid as well as copolymers with the acid per se. In particular, copolymers of ethylene with vinylacetate or alkyl acrylates, for example methyl acrylate, ethyl acrylate and butyl acrylate, can be employed. These ethylene copolymers typically comprise from about 70 to about 98 wt% ethylene, preferably from about 70 to 95 wt% ethylene, more preferably from about 73 to about 91 wt% ethylene, the balance of the copolymer being the alkyl ester. The expression "EVA" means, specifically, ethylene-vinylacetate copolymers. The ethylene-copolymer resins suitable for use in the practice of this invention have a melt index of from about 0.2 to about 50 (ASTM D 1238 Condition E).

The term EPDM is used in the sense of its ASTM designation. EPDM is a terpolymer of ethylene, propylene and a non-conjugated diene. Illustrative non-limiting examples of suitable non-conjugated dienes are 5-ethylidene-2-norbornene (ENB); 1,4-hexadiene; 5-methylene-2-norbornene (MNB), 1,6-octadiene; 5-methyl-1,4-hexadiene; 3,7-dimethyl-1,6-octadiene; 1,3-cyclopentadiene; 1,4-cyclohexadiene, tehahydroindene, methyltetrahydroindene, dicyclopentadiene, 5-isopropylidene-2-norbornene; 5-vinyl-norbornene, and the like. The preferred EPDM rubber is a terpolymer of ethylene, propylene and ENB.

The ethylene copolymer resin component of the polyolefin resins used in the practice of this invention comprises from about 25 to about 100 wt% of the polyolefin resin component of the blend, preferably from about 35 to about 100 wt% ethylene copolymer resin; more preferably from about 45 to about 100 wt%.

When one or more of the optionally included LDPE, VLDPE, LLDPE or polybutylene materials are utilized, the amount utilized will be from 0 to about 75 wt% of the polyolefin resin component; preferably from about 10 to about 55 wt%, more preferably from about 15 to about 35 wt%.

In its most preferred embodiment, the polyolefin resin component of the DVA composition of this invention consists of EVA. The EVA polyolefin resin is blended with at least one EPDM rubber and the EPDM rubber component of the blend is vulcanized using dynamic vulcanization techniques. The EVA polyolefin resin comprises from about 20 to about 90 wt% of the polyolefin resin plus EPDM rubber in the DVA; preferably from about 30 to about 80 wt% resin; more preferably from about 40 to about 60 wt% resin. The EPDM rubber component of the DVA composition comprises from about 80 to about 10 wt% of the composition based on the polyolefin resin plus EPDM rubber; preferably from about 75 to about 20 wt% EDPM rubber; more preferably from about 60 to about 40 wt% EPDM rubber.

Where it is desired to prepare a DVA composition of this invention to produce blown film having improved heat shrink properties, the curable EPDM rubber preferably comprises from about 10 to about 40 wt% of the polyolefin resin plus EPDM rubber component of the DVA.

Where it is desired to prepare a DVA composition of this invention to produce a molded article having unexpected superior resiliency properties, the curable EPDM rubber comprises from about 15 to about 50 wt.% of the polyolefin resin plus EPDM rubber component of the DVA.

The ethylene copolymer resin must comprise at least about 10 wt% of the total composition, i.e., ethylene copolymer resin, plus EPDM rubber and additives; preferably at least about 12 wt%; more preferably at least about 15 wt%.

In addition to its polymer components, the DVA composition of this invention can include reinforcing and non-reinforcing fillers, antioxidants, stabilizers, rubber processing oils, lubricants (e.g., oleamide), antiblocking agents, antistatic agents, waxes, coupling agents for the fillers, foaming agents, pigments, flame retardant additives and other processing aids known to the rubber compounding art. The pigments and fillers can comprise up to 50 wt% of the total DVA composition based on polymer components plus additives; preferably pigments and fillers comprise from 0 to about 30 wt% of the total composition.

Fillers can be inorganic fillers such as calcium carbonate, clays, silica or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. They are derived from petroleum fractions. The type of process oil utilized will be that customarily used in conjunction with the EPDM rubber component. The skilled rubber chemist will recognize which type of oil should be utilized with a particular rubber. The quantity of EPDM rubber process oil utilized is based on the total rubber content, both cured and uncured, and can be defined as the ratio, by weight, of process oil to the total EPDM rubber in the DVA. This ratio can vary from 0 to about 1.5/1; preferably from about 0.1/1 to about 0.75/1; more preferably from about 0.2/1 to about 0.5/1. Larger amounts of process oil can be used, the deficit being reduced physical strength of the composition. Oils other than petroleum based oils such as oils derived from coal tar and pine tar can also be utilized. In addition to the petroleum derived EPDM rubber process oils, organic esters and other synthetic plasticizers can be used.

Antioxidants can be utilized in the composition of this invention. The particular antioxidant utilized will depend on the EPDM rubber utilized and more than one type may be required. Their proper selection is well within the skill of the rubber processing chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-methylene-bis-(4-methyl-6-1, butylphenol}; 2,6'-di-t-butyl-o-dimethyl-amino-p-cresol; hydroquinone monobenzyl ether, octylated diphenyl amine, phenyl-beta-naphthylamine, N,N'-diphenyl-ethylene diamine; aldol-alpha-naphthylamine; N,N'-diphenyl-p-phenylene diamine, etc. The physical antioxidants include mixed petroleum waxes and microcrystalline waxes.

Any conventional cure system for the EPDM rubber to be dynamically vulcanized can be used except that peroxide cures are specifically excluded from the practice of this invention. Under conditions which would result in a fully cured EPDM rubber using peroxide, the ethylene copolymer resin of the present invention would vulcanize, thereby resulting in a fully cured non-thermoplastic composition. Otherwise, any particular curatives known in the art for the vulcanization of EPDM rubbers are suitable. These include sulfur cures as well as non-sulfur cures. Of course, accelerators such as dithiocarbamates or thiurams and thioureas can be included in these sulfur cures which also normally include zinc oxide.

Resin cures can be used for the EPDM rubbers. The resins useful as curatives are phenolic resins, brominated phenolic resins, urethane resins, and the like. The halogenated resin cure systems are generally metal activated for EPDM rubbers.

While phenolic resin cures are preferred, they impart a yellowish or orangish tinge to the rubber part. For EPDM rubbers, a sulfur cure system may be employed to permit the use of pigments such as $TiO_2$ to give bright white compositions.

It is within the scope of this invention to incorporate an uncured rubber in the composition. This can be accomplished by selecting as the uncured rubber a rubber which cannot be vulcanized by the vulcanizing agent used to cure the EPDM rubber which is to be dynamically vulcanized. For the EPDM rubbers of the present invention, where the cure system comprises sulfur or phenolic resins, any other rubber not vulcanizable can be included. Such rubbers include completely saturated EP rubber, polyisobutylene rubber and the like. In another embodiment the DVA can be prepared from the resin and the EPDM rubber to be dynamically vulcanized. After vulcanization a second uncured rubber can be blended into the DVA at a temperature above the melting point of the resin.

In another embodiment of this invention, two rubbers, at least one of which is an EPDM rubber, are blended together and the EPDM rubber is dynamically vulcanized using a curative which is not a vulcanizing agent for the other rubber, thereby forming a composition comprising a fully vulcanized rubber dispersed within the unvulcanized rubber. This composition can then be let down into an ethylene copolymer to form the composition of this invention.

In a variant of this invention, an EPDM rubber is dynamically vulcanized while in intimate contact with an ethylene copolymer utilizing an excess of vulcanizing agent to form the DVA of this invention. Thereafter, additional rubber is added and dynamically vulcanized, the quantity of curative having been preselected to ensure that it is inadequate to fully vulcanize the additional rubber.

In another variant, the DVA of this invention is prepared using an ethylene copolymer and EPDM rubber. Subsequently, under conditions of dynamic vulcanization a second rubber is added to the DVA with only sufficient curative to partially cure the second rubber. For example, EVA and an EPDM are blended and a sulfur curative added. The EPDM is dynamically vulcanized to form the DVA of this invention. Subsequently, chlorobutyl rubber is added with just sufficient ZnO to only partially cure the chlorinated butyl rubber.

Where an uncured rubber is included in the DVA composition of this invention, it comprises from 0 to about 50 wt% of the total rubber in the composition, preferably from about 5 to about 20 wt%.

In a preferred embodiment, the rubber to be vulcanized is EPDM rubbers which are preferably vulcanized with resin cures.

In the practice of this invention the polyolefin resin and EPDM rubber are mixed together at a temperature sufficient to soften the resin or, more commonly, at a temperature above its melting point where the resin is at least partially crystalline at room temperature, e.g., EVA. After the resin and rubbers are intimately mixed, the curative is added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the resin (about 90–110° C. in the case of EVA) to about 250° C.; more typically, the temperature range is from about 150° C. to about 225° C. Preferably the vulcanization is carried out at a temperature of from about 160° C. to about 200° C.

It is preferred that the mixing process be continued until vulcanization is complete. If vulcanization is permitted to continue after mixing has stopped, the composition may not be reprocessible as a themoplastic. However, the dynamic vulcanization can be carried out in stages. For example, vulcanization can be commenced at high temperatures in a twin screw extruder and before vulcanization is complete pellets can be formed of the partially prepared DVA using an underwater pelletizer, thereby quenching the curing step. At a later time vulcanization can be completed under dynamic vulcanization conditions. Those skilled in the art will appreciate the appropriate quantities, types of curatives and extent of mixing time required to carry out the vulcanization of the rubber. Where necessary the rubber can be vulcanized using varying amounts of curative to determine the optimum cure system to be utilized and the appropriate cure conditions to achieve a full cure.

While it is preferred that all components are present in the mix prior to carrying out the dynamic vulcanization process of this invention, this is not a necessary condition. For example, if a rubber is present which does not cure utilizing the selected curing agents, only the rubbers need be mixed thoroughly, followed by dynamic vulcanization in the absence of polyolefin resin. After vulcanization is complete, the dynamically vulcanized blend of rubbers can be let down into an ethylene copolymer resin to prepare the compositions of this invention.

The term "fully vulcanized" as used in the specification and claims with respect to the dynamically vulcanized rubber component of this invention means that the rubber component to be vulcanized has been cured to a state in which the physical properties of the rubber are developed to impart elastomeric properties to the rubber generally associated with the rubber in its conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber component blends to the extent that the composition contains no more than about four percent by weight of the cured rubber component extractable at room temperature by a solvent which dissolves the rubber which is intended to be vulcanized, and preferably to the extent that the composition contains less than two percent by weight extractable. In general, the less extractables of the cured rubber component, the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent, as well as that rubber component of the DVA which it is not intended to cure. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and the rubber. There may be highly significant reactions involved but of limited extent. However, the assumption that the cross-link density determined as described provides a useful approximation of the cross-link density of the thermoplastic elastomeric compositions is consistent with the thermoplastic properties and with the fact that a large proportion of the resin can be removed from the composition by high temperature solvent extraction, for example, by boiling decalin extraction.

The cross-link density of the rubber is determined by equilibrium solvent swelling using the Flory-Rehner equation. *J. Rubber Chem and Tech*, 30, p. 929. The appropriate Huggins solubility parameters for rubber-solvent pairs used in the calculation were obtained from the review article by Sheehan and Bisio, *J. Rubber Chem. & Tech.*, 39, 149. If the extracted gel content of the vulcanized rubber is low, it is necessary to use the correction of Bueche wherein the term y is multiplied by the gel fraction (%gel/100). The cross-link density is half the effective network chain density y determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

In the practice of this invention, resins such as LDPE, VLDPE, LLDPE and polybutylene can be utilized in conjunction with the ethylene copolymer resin. Generally, any resin with a crystalline melting point of less than 126° C. can be used in conjunction with the subject ethylene copolymer resin.

In order to produce a heat shrink article from the DVA composition of this invention, the DVA compositions are prepared, oriented at a temperature slightly below the softening point of the polyolefin resin and "frozen" into the oriented configuration, i.e., film, tubing, tape, etc. The forming of a product and its orientation can be continuous, e.g., blown film, or can be accomplished in a separate operation. Upon subsequent heating to a temperature above the softening point of the resin, the composition will shrink.

In order to produce an article for use in window-sealing or weatherstrip applications, the DVA compositions are prepared, and then extruded utilizing traditional thermoplastic resin processes well known in the art. The profile is quenched by air or water upon exiting the die of the extruder and typically, is transported by a conveyor belt take-away system. Alternatively, the DVA compositions can be utilized in molding processes.

The advantages of the instant invention will be more readily appreciated by reference to the following examples. Ingredients are described in Table II.

EXAMPLES I–VII

The compositions in Table I were Banbury mixed and underwater pelletized. The blends were dynamically vulcanized in the mixer by prolonging the mix (for about 4 minutes) at an elevated temperature (from about 170° to about 190° C.) after the addition of the cure system.

TABLE I

|  | Example I | | Example II | | Example III | | | |
|---|---|---|---|---|---|---|---|---|
|  | A | B | C | D | E | F | G | H |
| EPDM (VISTALON 3777)1 | — | 47.3 | — | 47.3 | 47.3 | 38.3 | 29.3 | 20.3 |
| EPDM (VISTALON 6505)2 | — | — | — | — | — | — | — | — |
| EPDM (VISTALON 3708)3 | — | — | — | — | — | — | — | — |
| Chlorobutyl 1066 4 | 27 | — | 27 | — | — | — | — | — |
| EVA (20% VA) | 27 | 27 | — | — | — | — | — | — |
| EVA (18% VA) | — | — | — | — | — | — | — | — |
| EVA (12% VA) | — | — | 20 | 20 | 27 | 36 | 45 | 54 |
| EVA (9% VA) | — | — | — | — | — | — | — | — |
| EMA (17% MA) | — | — | — | — | — | — | — | — |
| Dowlex 4001 5 | — | — | — | — | — | — | — | — |
| EY 904-25 (52% VA) | — | — | 7 | 7 | — | — | — | — |
| Circosol 4240 (oil) | 20 | — | 20 | — | — | — | — | — |
| Atomite | 17.1 | 17.3 | 17.1 | 17.3 | 16.6 | 17.5 | 18.5 | 19.3 |
| Titanox 2071 | 3 | 3 | 3 | 3 | 3 | 3 | 3 | 3 |
| SRF Black N774 | — | — | — | — | — | — | — | — |
| Stearic Acid | 0.5 | 0.5 | 0.5 | 0.5 | 0.5 | 0.5 | 0.5 | 0.5 |
| Weston 626 | — | — | — | — | 0.1 | 0.1 | 0.1 | 0.1 |
| Irganox 1010 | 0.1 | 0.1 | 0.1 | 0.1 | — | — | — | — |
| Cyanox 1790 | — | — | — | — | 0.1 | 0.1 | 0.1 | 0.1 |
| Maglite D | 1.2 | — | 1.2 | — | — | — | — | — |
| Tinuvin 770/327 | — | — | — | — | .4/.2 | .4/.2 | .4/.2 | .4/.2 |
| Zinc Oxide | 3.3 | 0.8 | 3.3 | 0.8 | 0.8 | 0.6 | 0.5 | 0.4 |
| SP-1055 Resin | — | 3.7 | — | 3.7 | 3.7 | 3.0 | 2.3 | 1.6 |
| Stannous Chloride | — | 0.3 | — | 0.3 | 0.3 | 0.3 | 0.2 | 0.2 |
| Permalux | 0.8 | — | 0.8 | — | — | — | — | — |
| Hardness, Shore A (Instantaneous/5 sec.) | 78/77 | 71/71 | 68/67 | 67/66 | 71/71 | 77/77 | 78/78 | 81/81 |
| Tension Set[6], % | 19 | 10 | — | — | 10.3 | 15.6 | 17.6 | 26 |
| Compression Set B, Plied, % | | | | | | | | |
| 22 hrs. @ 50/70° C. | 65.9/79.1 | 64.9/65.6 | — | — | — | — | — | — |
| 22 hrs. @ RT/70° C. | — | — | 22/60 | 23/54 | 20/54 | 19/66 | 25/69 | 27/78 |
| Tensile Strength (psi) | 855 | 1020 | 617 | 650 | 839 | 935 | 1123 | 1330 |
| Elongation, % | 400 | 459 | 214 | 189 | 248 | 242 | 390 | 409 |
| Modulus 100%/300% | 310/601 | 317/621 | 383/— | 423/— | 486/— | 626/— | 742/— | 831/— |
| Flexural Modulus, psi | 2286.3 | 2615.4 | — | — | 1405 | 2924 | 4253 | 6239 |
| Vicat Softening Point (200 gm; °C.) | 71 | 79 | 85 | 90 | 89 | 91 | 92 | 95 |
| Set at Break, % | — | — | 33 | 24 | 50 | 63 | 154 | 255 |
| Heat Shrink Recovery, % | — | — | — | — | — | — | — | — |
| Tear Strength, ppi | — | — | — | — | — | — | — | — |

|  | Example IV | | Example V | | | Example VI | |
|---|---|---|---|---|---|---|---|
|  | I | J | K | L | M | N | O |
| EPDM (VISTALON 3777)1 | 29.3 | 29.3 | 47.3 | 47.3 | 47.3 | — | 47.3 |
| EPDM (VISTALON 6505)2 | — | — | — | — | — | — | — |
| EPDM (VISTALON 3708)3 | — | — | — | — | — | — | — |
| Chlorobutyl 1066 4 | — | — | — | — | — | 27 | — |
| EVA (20% VA) | — | — | 9 | — | — | — | — |
| EVA (18% VA) | — | — | — | 27 | 18 | — | — |
| EVA (12% VA) | 45 | 36 | — | — | — | — | — |
| EVA (9% VA) | — | — | 9 | — | — | — | — |
| EMA (17% MA) | — | — | — | — | — | — | — |
| Dowlex 4001 5 | — | 9 | 9 | — | 9 | 27 | 27 |
| EY 904-25 (52% VA) | — | — | — | — | — | — | — |
| Circosol 4240 (oil) | — | — | — | — | — | 20 | — |
| Atomite | 18.5 | 18.5 | 16.6 | 16.6 | 16.6 | 17.1 | 17.3 |
| Titanox 2071 | 3 | 3 | — | — | — | 3 | 3 |
| SRF Black N774 | — | — | 3 | 3 | 3 | — | — |
| Stearic Acid | 0.5 | 0.5 | 0.5 | 0.5 | 0.5 | 0.5 | 0.5 |
| Weston 626 | 0.1 | 0.1 | — | — | — | — | — |
| Irganox 1010 | — | — | 0.1 | 0.1 | 0.1 | 0.1 | 0.1 |
| Cyanox 1790 | 0.1 | 0.1 | 0.1 | 0.1 | 0.1 | — | — |
| Maglite D | — | — | — | — | — | 1.2 | — |
| Tinuvin 770/327 | .4/.2 | .4/.2 | .4/.2 | .4/.2 | .4/.2 | — | — |
| Zinc Oxide | 0.5 | 0.5 | 0.8 | 0.8 | 0.8 | 3.3 | 0.8 |
| SP-1055 Resin | 2.3 | 2.3 | 3.7 | 3.7 | 3.7 | — | 3.7 |
| Stannous Chloride | 0.2 | 0.2 | 0.3 | 0.3 | 0.3 | — | 0.3 |
| Permalux | — | — | — | — | — | 0.8 | — |
| Hardness, Shore A (Instantaneous/5 sec.) | 78/78 | 81/81 | 75/74 | 74/74 | 75/75 | 77/76 | 79/78 |
| Tension Set [1], % | 17.6 | 19.7 | — | — | — | 18 | 19 |

TABLE I-continued

| Compression Set B, Plied, % | | | | | | | |
|---|---|---|---|---|---|---|---|
| 22 hrs. @ 50/70° C. | — | — | — | — | — | — | — |
| 22 hrs. @ RT/70° C. | 25/69 | 27/66 | 28/59 | 28/75 | 28/62 | 16/42 | 24/39 |
| Tensile Strength (psi) | 1123 | 1264 | 725 | 909 | 915 | 999 | 963 |
| Elongation, % | 390 | 337 | 284 | 373 | 332 | 354 | 275 |
| Modulus 100%/300% | 742/— | 812/— | 390/— | 362/712 | 391/822 | 449/869 | 492/— |
| Flexural Modulus, psi | 4253 | 4870 | — | — | — | 4272 | 4984 |
| Vicat Softening Point (200 gm; °C.) | 92 | 99 | 103 | 82 | 89 | 107 | 120 |
| Set at Break, % | 154 | 251 | 55 | 100 | 80 | — | — |
| Heat Shrink Recovery, % | — | — | — | — | — | — | — |
| Tear Strength, ppi | — | — | — | — | — | — | — |

| | Example VII | | | | | | | |
|---|---|---|---|---|---|---|---|---|
| | P | Q | R | S | T | U | V | W |
| EPDM (VISTALON 3777) 1 | — | 47 | 47 | — | — | — | — | 47.3 |
| EPDM (VISTALON 6505) 2 | — | — | — | 27 | — | — | — | — |
| EPDM (VISTALON 3708) 3 | — | — | — | — | 27 | 27 | 27 | — |
| Chlorobutyl 1066 4 | 27 | — | — | — | — | — | — | — |
| EVA (VA 27%) | — | — | — | — | — | 27 | — | — |
| EVA (20% VA) | 27 | 27 | 27 | 27 | 27 | — | — | 27 |
| EVA (18% VA) | — | — | — | — | — | — | — | — |
| EVA (12% VA) | — | — | — | — | — | — | — | — |
| EVA (9% VA) | — | — | — | — | — | — | — | — |
| EMA (17% MA) | — | — | — | — | — | — | 27 | — |
| Dowlex 4001 5 | — | — | — | — | — | — | — | — |
| EY 904-25 (52% VA) | — | — | — | — | — | — | — | — |
| Circosol 4240 (oil) | 20 | — | — | 20 | 20 | 20 | 20 | — |
| Atomite | 17.1 | 17.3 | 19 | 17.6 | 17.6 | 17.6 | 17.6 | 22.1 |
| Titanox 2071 | 3 | 3 | 3 | 3 | 3 | 3 | 3 | 3 |
| SRF Black N774 | — | — | — | — | — | — | — | — |
| Stearic Acid | 0.5 | 0.5 | 0.5 | 0.5 | 0.5 | 0.5 | 0.5 | 0.5 |
| Weston 626 | — | — | — | — | — | — | — | — |
| Irganox 1010 | 0.1 | 0.1 | 0.1 | 0.1 | 0.1 | 0.1 | 0.1 | 0.1 |
| Cyanox 1790 | — | — | — | — | — | — | — | — |
| Maglite D | 1.2 | — | — | — | — | — | — | — |
| Tinuvin 770/327 | — | — | 0.6 | — | — | — | — | — |
| Zinc Oxide | 3.3 | 0.8 | 1.5 | 0.8 | 0.8 | 0.8 | 0.8 | — |
| SP-1055 Resin | — | 3.7 | — | 3.7 | 3.7 | 3.7 | 3.7 | — |
| Stannous Chloride | — | 0.3 | — | 0.3 | 0.3 | 0.3 | 0.3 | — |
| Permalux | 0.8 | — | — | — | — | — | — | — |
| Hardness, Shore A (Instantaneous/10 sec.) | 58/57 | 61/59 | 62/60 | 59/57 | 64/60 | 55/55 | 73/70 | 57/53 |
| Tension Set (1), % | 19 | 16 | 16 | 13 | 13 | 16 | 13 | 13 |
| Compression Set B, Plied, % | | | | | | | | |
| 22 hrs. @ 50/70° C. | 52/— | 52/— | 52/— | 45/— | 52/— | 66/— | 49/— | 69/— |
| 22 hrs. @ RT/70° C. | 32/— | 33/— | 30/— | 25/— | 32/— | 34/— | 27/— | 52/— |
| Tensile Strength (psi) | 765 | 980 | 850 | 820 | 915 | 900 | 755 | 900 |
| Elongation, % | 370 | 475 | 480 | 270 | 285 | 400 | 120 | 830 |
| Modulus 100%/300% | 345/630 | 380/625 | 360/550 | 390/— | 465/— | 340/665 | 665/— | 265/350F |
| Flexural Modulus, psi | — | — | — | — | — | — | — | — |
| Vicat Softening Point (200 gm; °C.) | — | — | — | — | — | — | — | — |
| Set at Break, % | 69 | 94 | 88 | 31 | 44 | 56 | 5 | 300 |
| Heat Shrink Recovery, % | 38 | 41 | 44 | 50 | 50 | 47 | — | 35 |
| Tear Strength, ppi | 80 | 125 | 110 | 80 | 115 | 100 | 120 | 100 |

1 EPDM, 53 ML 1 + 8(127° C.), 75 phr oil, 66% ethylene
2 EPDM, 46 ML 1 + 8(127° C.), 53% ethylene
3 EPDM, 50 ML 1 + 8(127° C.), 65% ethylene
4 Chlorinated Isobutylene-Isoprene Copolymer, 55 ML 1 + 8(100° C.), 1.2 wt. % Cl$_2$
5 VLDPE, .912 density, 1 MI
6 Extended 100% at RT for 10 min., relaxed at RT for 10 min. under no tension.
7 Dumbbells from Tension Set test re-exposed to 50° C. for 10 min. under no tension.

TABLE II

INGREDIENT LIST

| Designation | Description | Supplier |
|---|---|---|
| Vistalon 3777 | EPDM, 75 phr oil extender | Exxon Chemical Americas (ECA) |
| Vistalon 6505 | EPDM | ECA |
| Vistalon 3708 | EPDM | ECA |
| Chlorobutyl 1066 | Chlorinated Isoprene-Isobutylene copolymer, 51–60 ML(1 + 8) 100° C. | ECA |
| EVA | — | ECA |
| EMA | — | Gulf Oil Chemical Co. |
| Dowlex 4001 | VLDPE, 0.912 density, 1 MI | Dow Chemical Co. |
| EY 904-25 | VAE resin (52% vinyl acetate) | USI Chemicals |
| Circosol 4240 (oil) | Naphthenic oil ASTM D2226, Type 103 | Sun Oil Co. |
| Atomite | Natural ground calcium carbonate, mean particle size - 3 microns | Thompson, Weinman & Co. |
| Titanox 2071 | Titanium Dioxide | NL Industries, Inc. |
| SRF Black N774 | Large particle size furnace black | Several |
| Stearic Acid | Long Chain Fatty Acid | Several |
| Weston 626 | Anti-oxidant | Borg-Warner |

TABLE II-continued
INGREDIENT LIST

| Designation | Description | Supplier |
| --- | --- | --- |
| Irganox 1010 | Anti-oxidant, thermal stabilizer | Ciba Geigy |
| Cyanox 1790 | Anti-oxidant, phosphite type | American Cyanamid |
| Maglite D | Magnesium oxide | C. P. Hall |
| Tinuvin 770/327 | Stabilizers | Ciba Geigy |
| Zinc Oxide | — | New Jersey Zinc |
| SP-1055 Resin | Brominated alkyl phenol resin | Schenectady Chemical |
| Stannous Chloride | — | Several |
| Permalux | Di-ortho guanidine salt of dicatechol borate | DuPont Elastomers Chemicals Dept. |

These examples demonstrate the unexpected improvement in resiliency of the EPDM-containing DVAs, particularly over the chlorobutyl-containing DVAs, as measured by tension set and by completeness of recovery from deformation. For example, the compositions of Example VII, Q-V, utilizing EPDM rubber show about twenty percent (Q, R & U) to over forty percent improvement in resiliency (tension set) as compared to Example VII, P utilizing chlorobutyl rubber. Furthermore, the tensile strength and tear strength of articles produced from the EPDM compositions are also significantly improved, particularly over articles produced from the chlorobutyl compositions. Similar results are achieved in Examples I, III, IV and VI. Higher service temperature, as indicated by higher Vicat temperatures, and unexpected improvement in shrink recovery are also obtained with the EPDM-containing DVA compositions of this invention. For example, the compositions of Example VII, Q-U, utilizing EPDM rubber show from about eight to about twenty-five percent improvement in heat shrink recovery as compared to P which utilizes chlorobutyl rubber.

Thus, the subject EPDM compositions are suitable for utilization in shrink applications such as film, tape and tubing used for automotive, electrical and packaging applications. Most importantly, such compositions are particularly suitable where high Vicat and/or improved resilience are required or desired, such as, for example, in window-sealing and weatherstrip applications which require retention of sealing capability in dynamic situations, particularly at elevated temperatures.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A thermoplastic olefin composition comprising an EPDM rubber fully cured by dynamic vulcanization in a thermoplastic resin consisting of (A) from 25 to 100 wt% of an ethylene copolymer resin selected from the group consisting of copolymers of ethylene with vinylacetate, copolymers of ethylene with alpha, beta monoethylenically unsaturated monocarboxylic acids and copolymers of ethylene with alkyl esters of said acids and (B) from 0 to 75 wt% of at least one additional polyolefin resin selected from the group consisting of polybutylene, low density polyethylene, very low density polyethylene, and linear low density polyethylene.

2. The composition of claim 1 wherein the ethylene copolymer resin comprises from about 20 to about 90 wt.% of the resin/rubber component of the composition.

3. The composition of claim 1 wherein the vulcanized EPDM rubber comprises about 10 to about 80 wt.% of the resin/rubber component of the composition.

4. The composition according to claim 1 wherein the vulcanized EPDM rubber comprises from about 20 to about 75 wt.% of the resin/rubber component of the composition.

5. The composition according to claim 4 wherein the vulcanized EPDM rubber comprises from about 40 to about 60 wt.% of the resin/rubber component.

6. The composition according to claim 1 wherein an inorganic filler is incorporated therein.

7. The composition according to claim 6 wherein the inorganic filler is calcium carbonate or clay.

8. The composition according to claim 1 wherein the ethylene copolymer resin is an ethylene-vinylacetate copolymer resin.

9. The composition according to claim 8 wherein the vinylacetate content of the copolymer is from about 2 to about 30 wt.%.

10. The composition according to claim 8 wherein the vinylacetate content of the copolymer is from about 9 to about 29 wt.%.

11. The composition according to claim 1 wherein the ethylene copolymer resin is an ethylene-methylacrylate copolymer resin.

12. The composition according to claim 1 having incorporated therein from 0 to about 50 wt.%, based on total rubber, of an uncured rubber.

13. The composition according to claim 12 wherein the uncured rubber comprises from about 5 to about 20 wt.% of the total rubber in the composition.

14. The composition according to claim 12 wherein the uncured rubber is selected from EP copolymer rubber and polyisobutylene rubber.

15. The composition according to claim 12 wherein the uncured rubber is styrene ethylene-butene block copolymer.

16. A process for preparing a DVA composition comprising the steps of
   (a) blending a thermoplastic resin consisting of (A) from 25 to 100 wt% of an ethylene copolymer resin selected from the group consisting of copolymers of ethylene with vinylacetate, copolymers of ethylene with alpha, beta monoethylenically unsaturated monocarboxylic acids and copolymers of ethylene with alkyl esters of said acids and (B) from 0 to 75 wt% of at least one additional polyolefin resin selected from the group consisting of polybutylene, low density polyethylene, very low density polyethylene, and linear low density polyethylene. and an EPDM rubber at a temperature above the melting point of the resin;
   (b) adding a non-peroxide cure system for the rubber to the resin/rubber blend; and (c) vulcanizing the rubber under dynamic vulcanization conditions for a time sufficient to fully vulcanize the rubber.

17. The process according to claim 16 wherein an additional rubber not vulcanizable by the vulcanizing agent is incorporated.

18. The process according to claim 17 wherein the additional rubber is introduced during the blending of the resin and rubber and prior to dynamic vulcanization.

19. The process according to claim 17 wherein the additional rubber is added after the rubber to be vulcanized is fully vulcanized, blending being continued until the additional rubber is uniformly dispersed in the resin/vulcanized rubber blend.

20. The process according to claim 16 wherein an additional rubber is added to the composition after the rubber to be vulcanized is fully vulcanized; said additional rubber being vulcanizable by the vulcanization agent; provided, however, that the vulcanizing agent is fully consumed during the dynamic vulcanization step and is unavailable to vulcanize any part of the additional rubber.

21. The process according to claim 16 wherein an additional rubber which is vulcanizable by the vulcanizing agent is added to the rubber/resin blend after the rubber to be vulcanized is fully vulcanized; said vulcanizing agent being present in an amount sufficient to at least partially cure the additional rubber, but insufficient to fully vulcanize the additional rubber.

22. The process according to claim 17 wherein the additional rubber is selected from EP copolymer rubber and polyisobutylene rubber.

23. The process according to claim 20 wherein the additional rubber is a styrene ethylene-butene block copolymer.

* * * * *